(12) United States Patent
Yu et al.

(10) Patent No.: US 11,574,647 B1
(45) Date of Patent: Feb. 7, 2023

(54) HAMR HEAD WITH NEAR-FIELD TRANSDUCER (NFT) WITH TRAILING BEVEL

(71) Applicant: Western Digital Technologies, Inc., San Jose, CA (US)

(72) Inventors: Mingjun Yu, Sunnyvale, CA (US); Pradeep Senanayake, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/404,924

(22) Filed: Aug. 17, 2021

(51) Int. Cl.
  *G11B 5/60* (2006.01)
  *G11B 5/31* (2006.01)
  *G11B 5/00* (2006.01)

(52) U.S. Cl.
  CPC ............ *G11B 5/314* (2013.01); *G11B 5/6088* (2013.01); *G11B 2005/0021* (2013.01)

(58) Field of Classification Search
  None
  See application file for complete search history.

(56) References Cited

U.S. PATENT DOCUMENTS

| | | |
|---|---|---|
| 8,619,513 B1 | 12/2013 | Challener et al. |
| 8,773,956 B1 | 7/2014 | Wang et al. |
| 8,947,985 B1 | 2/2015 | Morelli et al. |
| 9,142,233 B1 | 9/2015 | Gibbons et al. |
| 9,424,866 B1 * | 8/2016 | Cao .................... G11B 7/124 |
| 9,449,625 B1 * | 9/2016 | Vossough ............... G11B 5/314 |
| 9,472,220 B1 * | 10/2016 | Burgos ................. G11B 5/6088 |
| 9,786,311 B2 | 10/2017 | Chen |
| 10,204,646 B2 | 2/2019 | Matsumoto |
| 10,249,333 B2 | 4/2019 | Maletzky et al. |
| 10,770,098 B1 | 9/2020 | Peng |
| 2009/0073858 A1 * | 3/2009 | Seigler ................. G11B 5/314 |
| | | 369/112.27 |
| 2010/0103553 A1 * | 4/2010 | Shimazawa .......... G02B 6/1226 |
| | | 250/493.1 |
| 2011/0090588 A1 | 4/2011 | Gao et al. |

(Continued)

OTHER PUBLICATIONS

Anurup Datta and Xianfan Xu, "Improved Near-Field Transducer Design for Heat-Assisted Magnetic Recording," IEEE Trans, on Magnetics, vol. 52, No. 12, Dec. 2016.

(Continued)

*Primary Examiner* — Peter Vincent Agustin

(57) ABSTRACT

Disclosed herein are embodiments of a heat-assisted magnetic recording (HAMR) head that includes a near-field transducer (NFT) with a trailing bevel. Also disclosed are sliders and data storage devices comprising those HAMR heads, and methods of manufacturing HAMR heads with NFTs having trailing bevels. A HAMR head comprises a waveguide core, a main pole, and a NFT comprising a trailing beveled edge at an acute angle to an air-bearing surface (ABS) of the HAMR head. A method of fabricating a HAMR head comprises depositing material for a NFT, creating a trailing-side surface of the NFT, and creating a trailing beveled edge in the trailing-side surface of the NFT at the ABS, and forming a dielectric layer over the trailing beveled edge. The trailing beveled edge is at an acute angle to the ABS, and a remainder of the trailing-side surface of the NFT is substantially perpendicular to the ABS.

26 Claims, 7 Drawing Sheets

(56) References Cited

U.S. PATENT DOCUMENTS

| | | |
|---|---|---|
| 2011/0235480 A1 | 9/2011 | Goulakov et al. |
| 2017/0047088 A1 | 2/2017 | Matsumoto et al. |
| 2017/0287513 A1* | 10/2017 | Shimazawa ............ G11B 5/127 |
| 2017/0323659 A1* | 11/2017 | Matsumoto ........... G11B 5/3116 |
| 2019/0066722 A1* | 2/2019 | Maletzky ............. G11B 5/6082 |
| 2019/0088273 A1 | 3/2019 | Chen et al. |
| 2020/0294536 A1 | 9/2020 | Bashir et al. |
| 2021/0027809 A1 | 1/2021 | Habibi et al. |

OTHER PUBLICATIONS

International Search Report and Written Opinion from PCT/US2022/027958 (filed May 6, 2022), dated Sep. 22, 2022.

* cited by examiner

HAMR HEAD WITH NEAR-FIELD TRANSDUCER (NFT) WITH TRAILING BEVEL

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher magnetic moment materials, or techniques such as perpendicular recording (or both).

Another solution uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy ($K_u$) is heated locally during writing to lower the coercivity enough for writing to occur, but the coercivity/anisotropy is high enough that the recorded bits are thermally stable at the ambient temperature of the disk drive (the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air- or gas-bearing slider that also supports the read/write head and rides or "flies" above the disk surface. An evanescent wave generated at a surface of the waveguide couples to surface plasmons excited on the surface of the NFT, and a strong optical near-field is generated at the apex of the NFT output end. The NFT couples light onto the media at a spot of a size that is smaller than the optical diffraction limit, which heats a region of the media.

To write data, a magnetic field and heat are simultaneously applied to the area of the magnetic recording medium in which data is to be written. As a result, the temperature of the area increases and the coercivity decreases, thereby enabling the data to be written at a relatively modest field.

An important parameter in HAMR is the distance at the ABS between the waveguide and the NFT. It is desirable for the manufacturing process to allow this parameter to be well controlled in order to provide a HAMR disk drive with good performance. It is also desirable to simplify manufacturing processes for HAMR devices and systems.

BRIEF DESCRIPTION OF THE DRAWINGS

Objects, features, and advantages of the disclosure will be readily apparent from the following description of certain embodiments taken in conjunction with the accompanying drawings in which.

Figure 1:
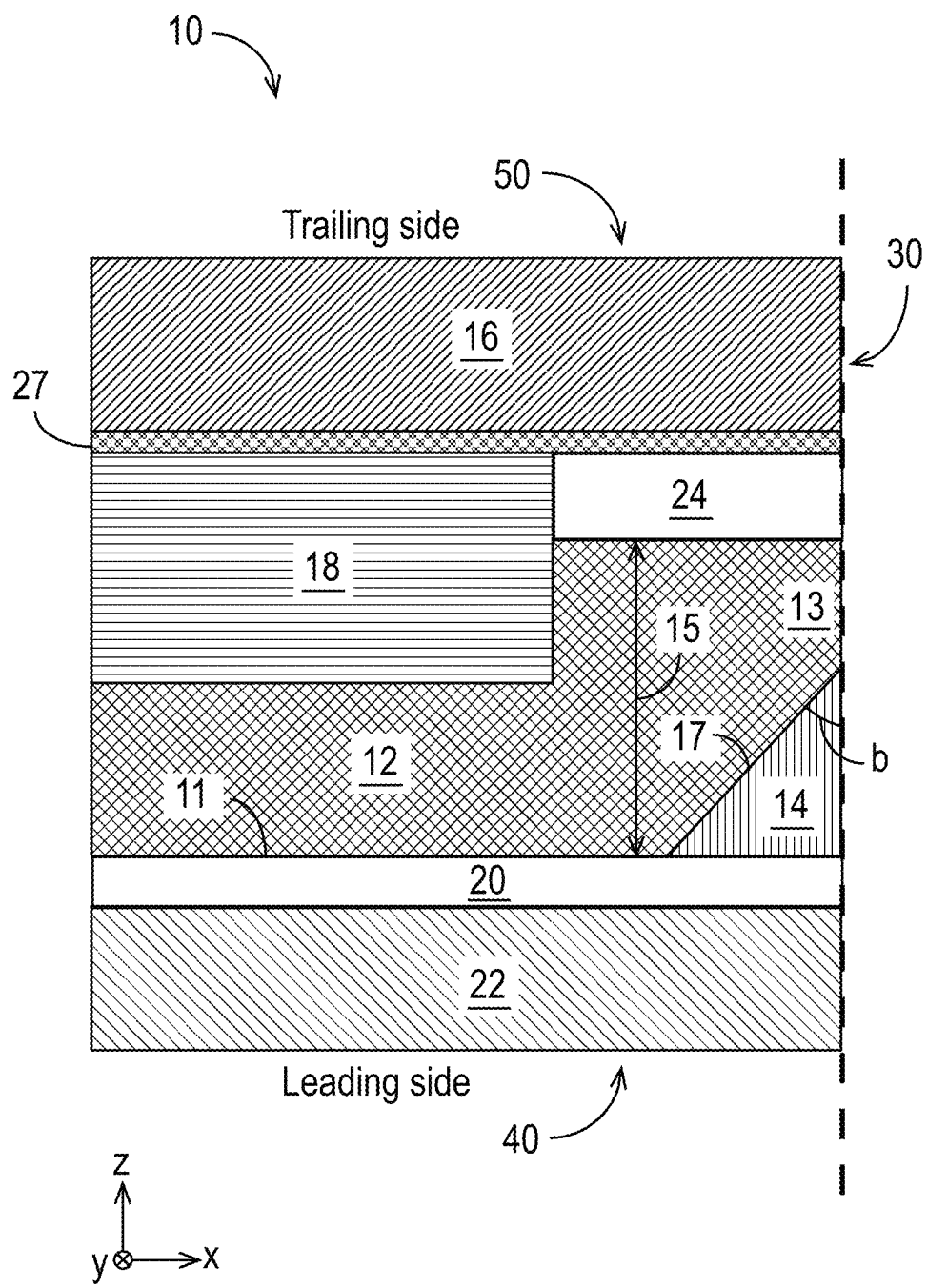
FIG. 1 is a cross-sectional view of a portion of a HAMR head with a NFT that has a leading bevel.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are HAMR heads that include NFTs that have trailing bevels, and sliders and data storage devices that include such HAMR heads. Also disclosed herein are methods of fabricating HAMR heads with NFTs that have trailing bevels.

In some embodiments, a HAMR head comprises a waveguide core, a main pole, and a NFT situated between the main pole and the waveguide core, wherein the NFT comprises a trailing beveled edge at a first angle to an ABS of the HAMR head, wherein the first angle is greater than zero and less than 90 degrees. In some embodiments, the first angle is approximately 45 degrees. In some embodiments, the first angle is between about 15 degrees and about 60 degrees.

In some embodiments, the HAMR head further comprises a dielectric layer adjacent to the trailing beveled edge. In some embodiments, the dielectric layer comprises a dielectric, such as $SiO_2$.

In some embodiments, the HAMR head further comprises a pole diffusion barrier layer situated between the NFT and the main pole. In some embodiments, the pole diffusion barrier layer comprises a metal.

In some embodiments, the main pole comprises a leading-side edge at a second angle to the ABS of the HAMR head, wherein the second angle is greater than zero and less than 90 degrees. In some embodiments, at least one of the first angle or the second angle is approximately 45 degrees. In some embodiments, at least one of the first angle or the second angle is between about 15 degrees and about 60 degrees. In some embodiments, the first angle and the second angle are approximately equal. In some embodiments, the first angle and the second angle are different.

In some embodiments, the HAMR head further comprises waveguide cladding situated between the waveguide core and a leading-edge side of the NFT. In some embodiments, the waveguide cladding comprises $SiO_2$. In some embodiments, the HAMR head further comprises a dielectric layer adjacent to the trailing beveled edge. In some embodiments, the waveguide cladding comprises a lossless dielectric, and the dielectric layer comprises the lossless dielectric (e.g., $SiO_2$).

In some embodiments, a shape of the NFT in an ABS view of the HAMR head is substantially rectangular or substantially trapezoidal.

In some embodiments, a data storage device comprises a magnetic recording medium and the HAMR head described above.

In some embodiments, a method of fabricating a HAMR head comprises depositing material for a NFT, patterning the NFT and creating a trailing-side surface of the NFT, creating a trailing beveled edge in the trailing-side surface of the NFT at an ABS of the HAMR head, wherein the trailing beveled edge is at an acute angle to the ABS and a remainder of the trailing-side surface of the NFT is substantially perpendicular to the ABS, and forming a dielectric layer over the trailing beveled edge. In some embodiments, the material of the NFT comprises a metal. In some embodiments, the metal comprises Au, Ag, Al, Ru, Rh, Pd, Pt, Ir, or Cu, or an alloy of Au, Ag, Al, Ru, Rh, Pd, Pt, Ir or Cu. Other materials may be used, such as, for example, refractory metal nitrides and alloys (e.g., NbN, NbTiN, TiN, MoSi, etc.).

In some embodiments, creating the trailing beveled edge in the trailing-side surface of the NFT at the ABS of the HAMR head comprises etching at least a portion of the trailing-side surface of the NFT.

In some embodiments, the dielectric layer comprises a lossless or near-lossless dielectric (e.g., $SiO_2$).

In some embodiments, forming the dielectric layer over the trailing beveled edge comprises depositing an insulator material over the trailing beveled edge and over at least a portion of the remainder of the trailing-side surface of the NFT, and removing material from the at least a portion of the remainder of the trailing-side surface of the NFT.

In some embodiments, the method further comprises depositing a pole diffusion barrier layer over an exposed portion of the NFT and over the dielectric layer after forming the dielectric layer over the trailing beveled edge. In some embodiments, the exposed portion of the NFT includes the remainder of the trailing-side surface of the NFT. In some embodiments, the method further comprises forming a main pole over the pole diffusion barrier layer after depositing the pole diffusion barrier layer of the exposed portion of the NFT and over the dielectric layer. In some embodiments, the main pole comprises a tapered portion extending toward a leading side of the HAMR head. In some embodiments, the acute angle of the of the trailing bevel of the NFT is a first acute angle, and at least a portion of a leading-side edge of the main pole is at a second acute angle from the ABS. In some embodiments, the first acute angle and the second acute angle are approximately equal. In some embodiments, the first acute angle and the second acute angle are between about 15 degrees and about 60 degrees. In some embodiments, the first acute angle and the second acute angle are approximately 45 degrees.

In some embodiments, a slider comprises a waveguide configured to propagate light emitted by a light source and to provide an evanescent wave at an ABS of the slider, a main pole configured to emit a recording magnetic field to affect a magnetic medium, and a NFT situated between the waveguide and the main pole, wherein the NFT comprises a trailing beveled edge extending to the ABS at an acute angle to the ABS.

In some embodiments, the NFT comprises Au, Ag, Al, Ru, Rh, Pd, Pt, Ir, or Cu, or an alloy of Au, Ag, Al, Ru, Rh, Pd, Pt, Ir, or Cu. As noted above, other materials may be used in addition or instead, such as, for example, refractory metal nitrides and alloys (e.g., NbN, NbTiN, TiN, MoSi, etc.).

In some embodiments, the acute angle is approximately 45 degrees. In some embodiments, the acute angle is between about 15 degrees and about 60 degrees. In some embodiments, the acute angle is a first acute angle, and the main pole comprises a leading beveled edge at a second acute angle to the ABS. In some embodiments, the first acute angle and the second acute angle are approximately equal. In some embodiments, the first acute angle and the second acute angle are between about 15 degrees and about 60 degrees. In some embodiments, the first acute angle and the second acute angle are approximately 45 degrees.

In some embodiments, the slider further comprises a dielectric layer between the main pole and the NFT, wherein the dielectric layer is adjacent to the trailing beveled edge.

In some embodiments, the slider further comprises a pole diffusion barrier layer situated between the dielectric layer and the main pole. In some embodiments, the pole diffusion barrier layer comprises a metal.

In some embodiments, in an ABS view of the slider, at least a portion of a side of an output tip of the NFT is at an angle to a track direction (e.g., an uptrack or downtrack direction). In some embodiments, the angle is between approximately 15 degrees and approximately 60 degrees. In some embodiments, in an ABS view of the slider, a shape of an output tip of the NFT is substantially trapezoidal.

In some embodiments, a data storage device comprises a recording medium and the slider.

FIG. 1 is a cross-sectional view of a portion 10 of a HAMR head that includes a NFT with a leading bevel. The portion 10 of the HAMR head shown in FIG. 1 has a leading side 40, a trailing side 50, and an ABS 30. A main pole 16 is situated in the HAMR head on the trailing side 50 of the portion 10 shown in FIG. 1. The main pole 16 is configured to emit a recording magnetic field for affecting a magnetic medium, the main pole 16 serving as a first electrode and having a front portion at the ABS 30. A return pole (not shown in the portion 10) in the HAMR head serves as a second electrode and also has a front portion at the ABS 30. The main pole 16 and return pole may both be constructed of a magnetic material that produces a high saturation flux density, such as, for example, NiFe, CoFeNi, or CoFe.

A waveguide core 22 is disposed in the HAMR head on the leading side 40 of the portion 10 shown in FIG. 1. The waveguide core 22 may be made from any suitable material. For example, the waveguide core 22 may be polymer, quartz fiber, or plastic fiber. As another example, the waveguide core 22 may comprise one or more dielectric/oxide materials.

The portion 10 of the HAMR head also includes a NFT 12. The NFT 12 is positioned between the main pole 16 and the waveguide core 22. The NFT 12 has a surface 11 that is parallel to and spaced from the waveguide core 22 by a waveguide cladding 20. The NFT 12 has an output tip 13 having an end at the ABS 30.

The waveguide core 22 receives, for example, semiconductor laser light from a laser source and transmits it to the NFT 12. The laser source may be a laser diode of InP type, GaAs type, GaN type, or the like, such as used in applications such as communications, optical disc storage, and material analysis. The laser source may emit laser light of any wavelength within the range of, for example, 375 nm to 1.7 m. The laser source may be located on the slider along with the HAMR head or in a location remote from it.

The laser diode generates an electric field at the output tip 13, which heats a portion of the hard recording layer of the magnetic medium underneath the ABS 30 of the HAMR head, thereby lowering the coercivity in the specific portion or "bit" of the magnetic medium so that the magnetic field from the main pole 16 can alter its magnetization. Near the ABS 30, the NFT 12 has a leading-side tapered edge 17 (which may also be referred to as a leading bevel) inclined at an acute angle to the ABS 30. The leading-side tapered edge 17 is at an angle b (typically 30 to 60 degrees) to the ABS 30.

A thermal shunt 18 is recessed from the output tip 13 and is situated between the NFT 12 and the main pole 16, contacting the output tip 13, a dielectric layer 24, and a pole diffusion barrier layer 27, which mitigates diffusion between the main pole 16 and the NFT 12. The dielectric layer 24 comprises a dielectric, such as, for example, $SiO_2$, $Al_2O_3$, or similar material. The material used for the dielectric layer 24 may be the same as or different from the material used for the waveguide cladding 20. The thermal shunt 18 conducts heat away from the NFT 12 and to the main pole 16. The purpose of the thermal shunt 18 is to reduce the temperature of the NFT 12, thereby avoiding possible thermal damage. The HAMR head may also include a heat sink (not shown in the portion 10) that conducts heat away from the main pole 16 and facilitates heat transfer for the magnetic medium. If present, the heat sink contacts and surrounds the main pole 16 on its trailing side and also contacts the thermal shunt 18.

The portion 10 of the HAMR head of FIG. 1 includes a high refractive index material (HRIM) layer 14 positioned adjacent to the leading-side tapered edge 17 of the NFT 12 and extending to the ABS 30. The objective of the HRIM layer 14 is to improve the optical efficiency of the NFT 12. This increase in optical efficiency reduces the required laser power as well as the temperature of the NFT 12. Thus, the HRIM layer 14 may be configured such that its refractive index is higher than that of the waveguide cladding 20, thereby reducing the amount of light that is reflected by the NFT 12 back to the laser diode. For example, the HRIM layer 14 could comprise an oxide.

In the portion 10 of the HAMR head shown in FIG. 1, the waveguide core 22 faces the leading-side tapered edge 17 of the NFT 12 and is separated from the NFT 12 and HRIM layer 14 by a waveguide cladding 20 with a thickness that may be, for example, between 5 and 50 nm. The waveguide cladding 20 surrounds the NFT 12 and the HRIM layer 14, insulating at least the output tip 13 of the NFT 12 and the adjacent portion of the HRIM layer 14 from the waveguide core 22, the heat sink, and the main pole 16. The waveguide core 22 and the waveguide cladding 20 are made of dielectric materials to ensure that a refractive index of the waveguide core 22 is greater than the refractive index of the waveguide cladding 20, thereby facilitating the efficient propagation of light through the waveguide core 22. For example, $Al_2O_3$ may be used as the material for the waveguide cladding 20 and $TiO_2$ as the material of the waveguide core 22. Alternatively, $SiO_2$ may be used as the material for the waveguide cladding 20 and $Ta_2O_5$, $TiO_2$, $SiO_xN_y$, or Ge-doped $SiO_2$ as the material for the waveguide core 22. The waveguide core 22 may be single-mode or multi-mode.

When the semiconductor laser light is introduced by the light source (e.g., a laser diode) into the waveguide core 22, the light propagates along the length of the waveguide core 22, and an evanescent wave is generated at the surface of the waveguide core 22 proximate the ABS 30. The evanescent wave at the surface of the waveguide core 22 polarizes in a direction along the plane of the ABS 30, coupling to a surface plasmon excited on the surface of the output tip 13 of the NFT 12. The surface plasmon causes charges to move in a down-track direction and concentrate in the space at the ABS 30 between the output tip 13 of the NFT 12 and the main pole 16, subsequently generating a localized electrical field that is known as an optical near-field spot. The main pole 16 then applies a magnetic field and affects the magnetization of the portion of the magnetic medium at the optical near-field spot.

One issue with the HAMR head described in the discussion of FIG. 1 is that the manufacturing process is relatively complex, in part due to the HRIM layer 14 and also due to the thermal shunt 18. For example, assuming that the layers of the portion 10 of the HAMR head shown in FIG. 1 are fabricated in the order from bottom to top, after forming the waveguide core 22 and waveguide cladding 20, the fabrication process may include the following steps (among others): (1) depositing the material for the HRIM layer 14; (2) after depositing the material for the HRIM layer 14, using a suitable etching technique to remove material from the HRIM layer 14 to create a smooth, angled edge in the HRIM layer 14 so that the subsequently-deposited material for the NFT 12 will create the desired leading-side tapered edge 17 in the NFT 12; (3) depositing the NFT 12 material; (4) patterning the NFT 12 using a suitable etching technique and then flattening the exposed surface of the NFT 12 by further etching and/or planarization to create a smooth surface; (5) depositing the dielectric layer 24 on the flattened trailing-side surface of the NFT 12; (6) removing dielectric material deposited in step (5) where the thermal shunt 18 will be situated (leaving NFT 12 material only in the NFT 12 area shown in FIG. 1); (7) depositing material for and planarizing the thermal shunt 18, (8) depositing the pole diffusion barrier layer 27 over the thermal shunt 18 and the dielectric layer 24 on the trailing side of the NFT 12, and (9) building the main pole 16 over the pole diffusion barrier layer 27.

It would be desirable to have a simpler manufacturing process for a HAMR head than the one described above. Relatedly, the distance at the ABS 30 between the waveguide core 22 and the NFT 12 is an important parameter for HAMR heads, and it would be desirable to be able to reliably control the distance solely by deposition rather than by a combination of deposition and etching.

Disclosed herein are embodiments of HAMR heads with a different configuration that both simplifies the manufacturing process of HAMR heads and provides better control over their dimensions. Unlike the HAMR head discussed in the context of FIG. 1, the disclosed HAMR heads do not include a leading bevel in the NFT, nor do they require a thermal shunt.

Figure 2:
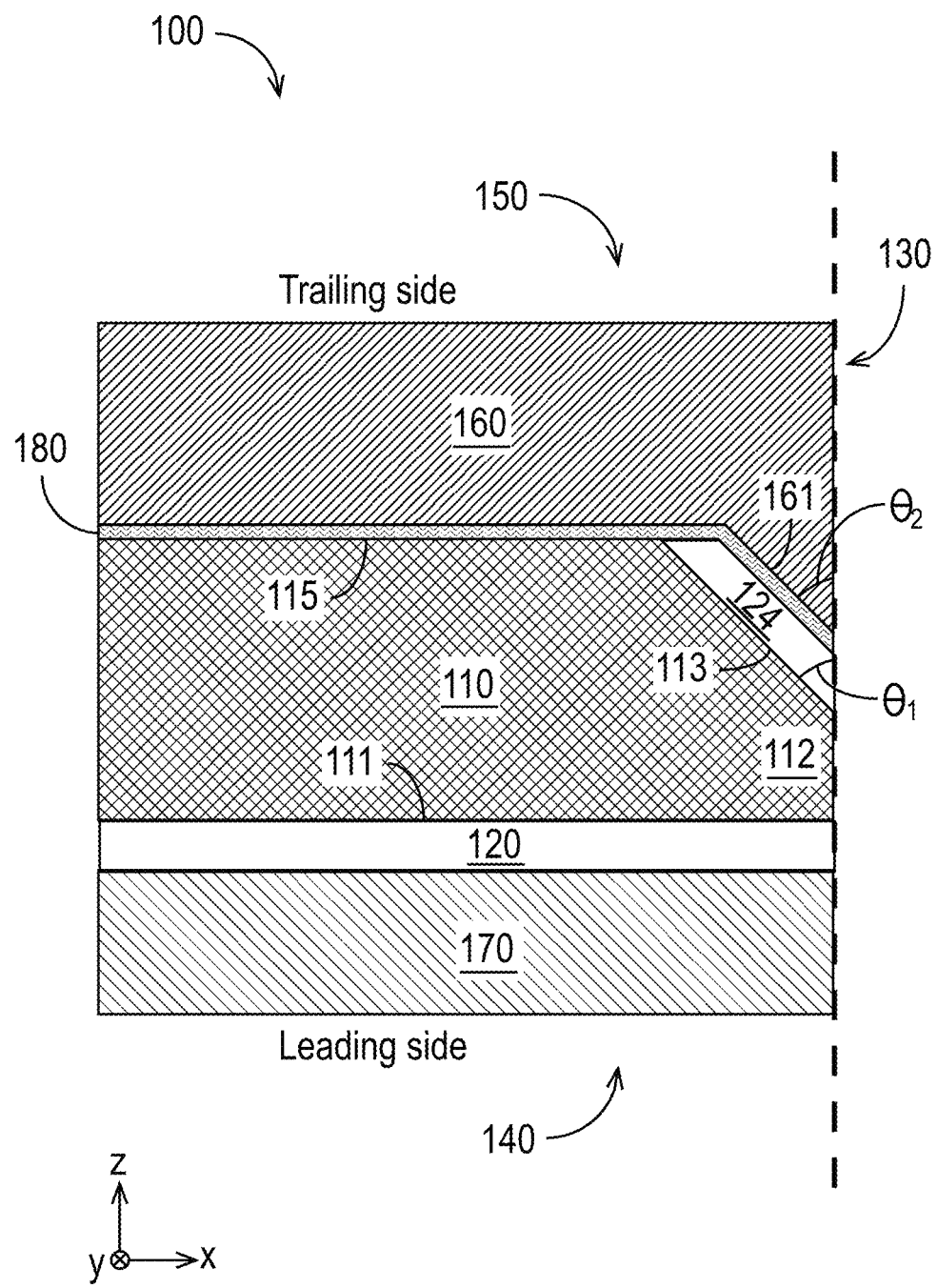
FIG. 2 is a cross-sectional view of an exemplary portion of an exemplary HAMR head with a trailing bevel in accordance with some embodiments.

FIG. 2 is a cross-sectional view of an exemplary portion 100 of an exemplary HAMR head in accordance with some embodiments. The exemplary portion 100 of the exemplary HAMR head shown in FIG. 2 has a leading side 140, a trailing side 150, and an ABS 130. The exemplary portion 100 shown in FIG. 2 may be disposed, for example, in a slider and/or in a data storage device.

The exemplary HAMR head includes a waveguide core 170 and waveguide cladding 120 on the leading side 140 of the exemplary portion 100 shown in FIG. 2. The waveguide cladding 120 and waveguide core 170 may comprise dielectric materials such that a refractive index of the waveguide core 170 is greater than the refractive index of the waveguide cladding 120, thereby facilitating the efficient propagation of light through the waveguide core 170, as explained above in the discussion of FIG. 1. For example, $Al_2O_3$ may be used as the material for the waveguide cladding 120 and $TiO_2$ as the material for the waveguide core 170. Alternatively, $SiO_2$ may be used as the material for the waveguide cladding 120 and $Ta_2O_5$, $TiO_2$, $SiO_xN_y$, or Ge-doped $SiO_2$ as the material for the waveguide core 170. Other materials may be used for the waveguide cladding 120 and/or the waveguide core 170, and the examples provided herein are not intended to be limiting. The waveguide core 170 may be single-mode or multi-mode. The waveguide cladding 120 may have a thickness of, for example, between about 5 nm and about 50 nm.

The exemplary portion 100 of the exemplary HAMR head shown in FIG. 2 also includes a NFT 110 with a surface 111 that is separated from the waveguide core 170 by the waveguide cladding 120. The NFT 110 may comprise, for example, a conductive low-loss metal (e.g., Au, Ag, Al, Ru, Rh, Pd, Ir, or Cu, or alloys of Au, Ag, Al, Ru, Rh, Pd, Pt, Ir, or Cu) or another material such a refractory metal nitride or alloy (e.g., NbN, NbTiN, TiN, MoSi, etc.). Unlike the NFT 12 shown in FIG. 1, the NFT 110 does not have a leading bevel. Instead, the NFT 110 has a trailing beveled edge 113 (which may also be referred to herein as a trailing bevel) inclined at an angle to the ABS 130. Specifically, an angle $\theta_1$ is formed between the trailing beveled edge 113 of the NFT 110 and the ABS 130. The angle $\theta_1$ may have any value greater than 0 and less than 90 degrees. For example, the angle $\theta_1$ may be between about 15 degrees and about 60 degrees. In some embodiments, the angle $\theta_1$ is approximately 45 degrees. The trailing beveled edge 113 is part of the trailing-side surface of the NFT 110 and intersects a remaining trailing-side surface 115 of the NFT 110. In the exemplary embodiment of FIG. 2, the remaining trailing-side surface 115 is substantially perpendicular to the ABS 130 and substantially parallel to the surface 111. The inclusion of the trailing bevel rather than a leading bevel concentrates light nearer to the waveguide core 170 and thereby changes the location of the optical near-field spot relative to its location when using the HAMR head described in the discussion of FIG. 1.

The NFT 110 has an output tip 112 defined as roughly the region between the trailing beveled edge 113 and the surface 111 near the ABS 130. The output tip 112 can have any suitable shape. For example, when viewed from the ABS 130, the output tip 112 can have a roughly triangular shape, a trapezoidal shape, a rectangular shape, etc.

The exemplary HAMR head also includes a main pole 160 on the trailing side 150 of the exemplary portion 100 shown in FIG. 2. The main pole 160 is configured to emit a recording magnetic field for affecting a magnetic medium situated under the ABS 130. Thus, the main pole 160 serves as a first electrode and has a front portion at the ABS 130. A return pole (not shown in the exemplary portion 100 of the HAMR head) serves as a second electrode and also has a front portion at the ABS 130. The main pole 160 and return pole may both be constructed of a magnetic material that produces a high saturation flux density, such as, for example, NiFe, CoFeNi, and/or CoFe.

In contrast to the main pole 16 of FIG. 1, the main pole 160 has a leading-side edge 161 that is inclined at an angle to the ABS 130. Specifically, an angle $\theta_2$ is formed between the leading-side edge 161 of the main pole 160 and the ABS 130. The angle $\theta_2$ may have any value greater than 0 and less than 90 degrees. For example, the angle $\theta_2$ may be between about 15 degrees and about 60 degrees. In some embodiments, the angle $\theta_2$ is approximately 45 degrees. It is to be understood that the angle $\theta_2$ could be 0, in which case the shape of the dielectric layer 124 would be triangular in the cross-section view of FIG. 2.

The angle $\theta_1$ (between the trailing beveled edge 113 of the NFT 110 and ABS 130) and the angle $\theta_2$ (between the leading-side edge 161 of the main pole 160 and the ABS 130) may be approximately equal, in which case the trailing beveled edge 113 and the leading-side edge 161 may be said to be coplanar. For example, in some embodiments, the angle $\theta_1$ and the angle $\theta_2$ are both a selected value between about 15 and about 60 degrees. In some embodiments, the angle $\theta_1$ and the angle $\theta_2$ are both approximately 45 degrees.

In other embodiments, the angle $\theta_1$ and the angle $\theta_2$ are different from each other, and the trailing beveled edge 113 and leading-side edge 161 are not coplanar. As will be appreciated by those having ordinary skill in the art, the angle $\theta_1$ and the angle $\theta_2$ can be adjusted to tune the performance of the HAMR head, and specifically to control the location on the magnetic media of the optical near-field spot and/or the gradient of the magnetic field applied by the main pole 160.

The output tip 112 is spaced apart from the main pole 160 by a dielectric layer 124. In the exemplary portion 100 shown in FIG. 2, the dielectric layer 124 is adjacent to the trailing beveled edge 113. As suggested by its name, the dielectric layer 124 comprises a dielectric, such as, for example, $SiO_2$, $Al_2O_3$, or similar material. The material used for the dielectric layer 124 may be the same as or different from the material used for the waveguide cladding 120.

The exemplary portion 100 of the exemplary HAMR head illustrated in FIG. 2 also includes a pole diffusion barrier layer 180. The pole diffusion barrier layer 180 is situated between the NFT 110 and the main pole 160, and, closer to the ABS 130, between the dielectric layer 124 and the leading-side edge 161 of the main pole 160. The objective of the pole diffusion barrier layer 180 is to mitigate diffusion between the main pole 160 and the NFT 110. Accordingly, in some embodiments, the pole diffusion barrier layer 180 comprises a metal. In some embodiments, the pole diffusion barrier layer 180 comprises one or more of: molybdenum (Mo), niobium (Nb), nickel (Ni), hafnium (Hf), neodymium (Nd), holmium (Ho), zirconium (Zr), yttrium (Y), iridium (Ir), tantalum (Ta), tungsten (W), titanium (Ti), rhodium (Rh), ruthenium (Ru), or other metals.

In the example exemplary portion 100 shown in FIG. 2, the dielectric layer 124 is shown as being situated only over the trailing beveled edge 113.

Unlike the HAMR head described above in the discussion of the portion 10 in FIG. 1, the exemplary portion 100 of the exemplary HAMR head does not include a thermal shunt. The thermal shunt is not needed in the exemplary HAMR head described in the context of FIG. 2 because the dielectric layer 124 is built naturally as part of the NFT 110 trailing bevel.

When the exemplary portion 100 shown in FIG. 2 is in operation (along with other components of the HAMR head not specifically illustrated in FIG. 2, such as the return pole), light introduced by a light source propagates along the length of the waveguide core 170, and an evanescent wave is generated at the surface of the waveguide core 170 proximate the ABS 130. The evanescent wave at the surface of the waveguide core 170 polarizes in a direction along the plane of the ABS 130, coupling to a surface plasmon excited on the surface of the output tip 112 of the NFT 110. The surface plasmon causes charges to move in a down-track direction and concentrate in the space at the ABS 130 between the output tip 112 of the NFT 110 and the end of the main pole 160, subsequently generating an optical near-field spot. As explained above, relative to its location when the HAMR head described in the discussion of FIG. 1 is used, the location of the optical near-field spot is closer to the waveguide core 170 due to the trailing bevel. The main pole 160 then applies a magnetic field and affects the magnetization of the portion of the magnetic medium at the optical near-field spot.

Although FIG. 2 illustrates a trailing beveled edge 113 that is linear, it is to be understood that the trailing beveled edge 113 can have other characteristics. For example, it could be, in cross-section, piecewise linear and/or curved along part or all of its length. Furthermore, it is to be appreciated that FIG. 2 illustrates only an exemplary portion 100 of the HAMR head, which includes additional components (e.g., a return pole).

One benefit of the exemplary portion 100 shown in FIG. 2 is the relative ease (as compared to the process to manufacture the portion 10 of FIG. 1) with which the trailing beveled edge 113 can be created through the removal of material from the NFT 110 (e.g., via etching). Thus, the exemplary portion 100 allows certain of the manufacturing steps needed to manufacture the portion 10 to be eliminated, thereby allowing for a simpler manufacturing procedure.

For example, assuming that the layers of the exemplary portion 100 of the HAMR head shown in FIG. 2 are fabricated in the order from bottom to top, after forming the waveguide core 170 and waveguide cladding 120, the fabrication process may include the following steps: (a) depositing the NFT 110 material; (b) defining and planarizing the NFT 110; (c) creating the trailing beveled edge 113 (e.g., via etching); (d) depositing the dielectric layer 124; (e) removing excess material from the remaining trailing-side surface 115 (e.g., via planarization, etching, etc.); (f) (optionally) depositing the pole diffusion barrier layer 180 over the exposed remaining trailing-side surface 115 and the dielectric layer 124, and (g) building the main pole 160 over the pole diffusion barrier layer 180. Overall, this process is simpler than the process described above for the portion 10 of the HAMR head illustrated in FIG. 1. For example, steps (1) and (2) of the procedure described above for the portion 10 are eliminated from the process to manufacture the exemplary portion 100. Furthermore, instead of having to perform steps (4) and (5) of the procedure described above for the portion 10, the NFT 110 of the exemplary portion 100 can be deposited over the waveguide cladding 120, and then material can be removed to create the trailing beveled edge 113, and the trailing beveled edge 113 and the remaining trailing-side surface 115 can be planarized. In addition, because the exemplary portion 100 does not include a thermal shunt 18, step 7 is eliminated altogether.

Figure 3:
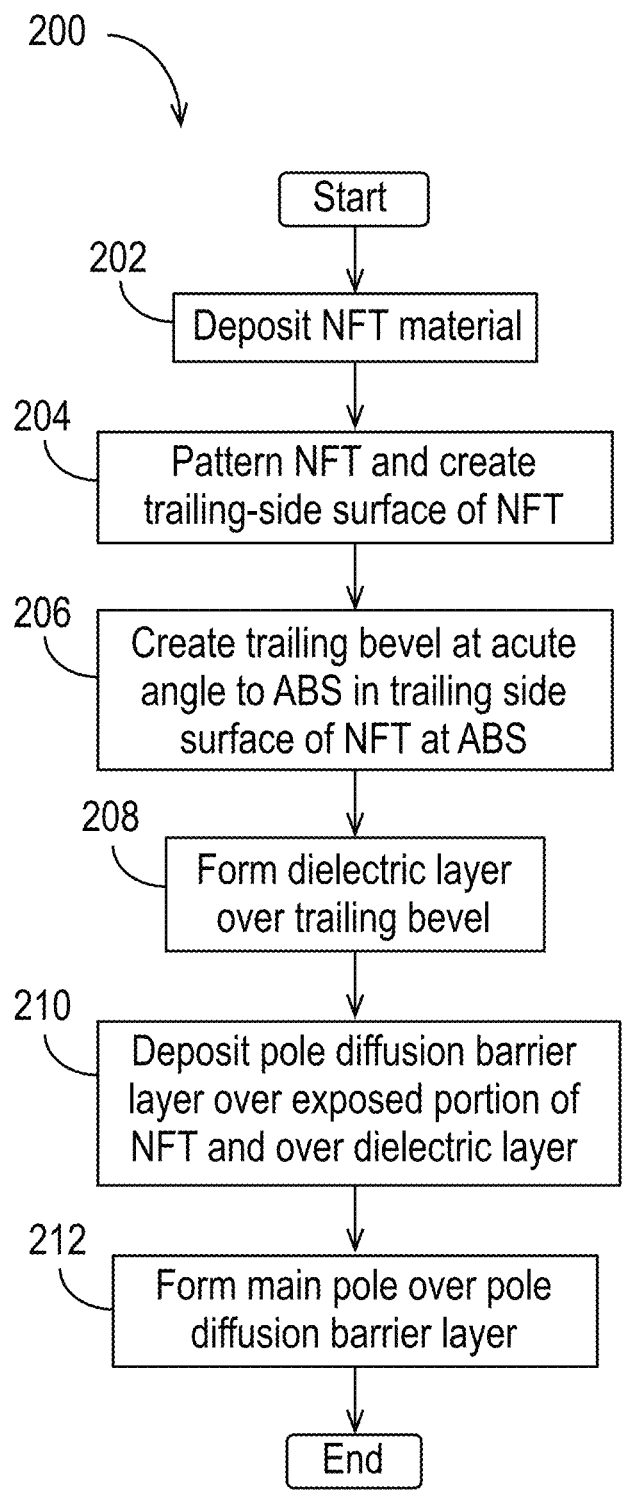
FIG. 3 is a flow diagram of an exemplary method of manufacturing a portion of a HAMR head with a trailing bevel in accordance with some embodiments.

FIG. 3 is a flow diagram of an exemplary method 200 of manufacturing a portion of a HAMR head in accordance with some embodiments. The flow diagram for the exemplary method 200 begins after the waveguide core 170 and waveguide cladding 120 have been fabricated. At block 202, material for the NFT 110 is deposited. As explained above, the NFT 110 may comprise, for example, a conductive low-loss metal (e.g., Au, Ag, Al, Ru, Rh, Pd, Pt, Ir, or Cu, or an alloy of Au, Ag, Al, Ru, Rh, Pd, Pt, Ir, or Cu) or another material such as refractory metal nitrides and alloys (e.g., NbN, NbTiN, TiN, MoSi, etc.).

At block 204, the NFT 110 is patterned, and the remaining trailing-side surface 115 (which may also be referred to as the remainder of the trailing-side surface) of the NFT 110 is created (e.g., by etching and/or planarizing the material deposited in block 202).

At block 206, the trailing beveled edge 113 is created. For example, material may be removed from the NFT 110 near the ABS 130 (e.g., by etching or any other suitable technique) to create the trailing beveled edge 113. As explained above, the trailing beveled edge 113 is at an acute angle to the ABS 130 (e.g., $\theta_1$ shown in FIG. 2).

At block 208, a dielectric layer (e.g., the dielectric layer 124) is formed over the trailing beveled edge 113. This step may include, for example, depositing a dielectric (e.g., a lossless or near-lossless dielectric, such as $SiO_2$) over the trailing beveled edge 113 and over at least a portion of the remaining trailing-side surface 115, and removing excess material (e.g., via etching and/or planarization) from the at least a portion of the remaining trailing-side surface 115 (e.g., via planarization, etching, etc.). It is to be appreciated that material may also be removed from the dielectric layer itself during this step.

At block 210, material is deposited over the remaining trailing-side surface 115 (the exposed portion of the NFT 110) and dielectric layer (e.g., dielectric layer 124) to form a pole diffusion barrier layer 180. As explained above, the material for the pole diffusion barrier layer 180 may include one or more of: molybdenum (Mo), niobium (Nb), nickel (Ni), hafnium (Hf), neodymium (Nd), holmium (Ho), zirconium (Zr), yttrium (Y), iridium (Ir), tantalum (Ta), tungsten (W), titanium (Ti), rhodium (Rh), ruthenium (Ru), or other metals.

At block 212, the main pole 160 is formed. The main pole 160 is formed over the pole diffusion barrier layer 180. In the exemplary portion 100 shown in FIG. 2, the main pole 160 comprises a tapered portion extending toward the leading side of the HAMR head. With reference to the exemplary embodiment of FIG. 2, the tapered portion of the main pole 160 is the approximately triangular-shaped portion residing between the leading-side edge 161 and the ABS 130. As explained above, the leading-side edge 161 of the main pole 160 may be at an angle (e.g., the angle $\theta_2$ shown in FIG. 2) to the ABS 130. As explained above, the angle $\theta_1$ (between the trailing beveled edge 113 of the NFT 110 and the ABS 130) and the angle $\theta_2$ (between the leading-side edge 161 of the main pole 160 and the ABS 130) may be approximately equal. For example, in some embodiments, the angle $\theta_1$ and the angle $\theta_2$ are both a selected value between about 15 and about 60 degrees. In some embodiments, the angle $\theta_1$ and the angle $\theta_2$ are both approximately 45 degrees. As also explained above, the angle $\theta_1$ and the angle $\theta_2$ may, alternatively, be different.

It is to be understood that although FIG. 3 illustrates steps of the exemplary method 200 in a particular order, certain of the steps may be performed in a different order. As one example, block 206 could be performed before block 204.

Figure 4A:
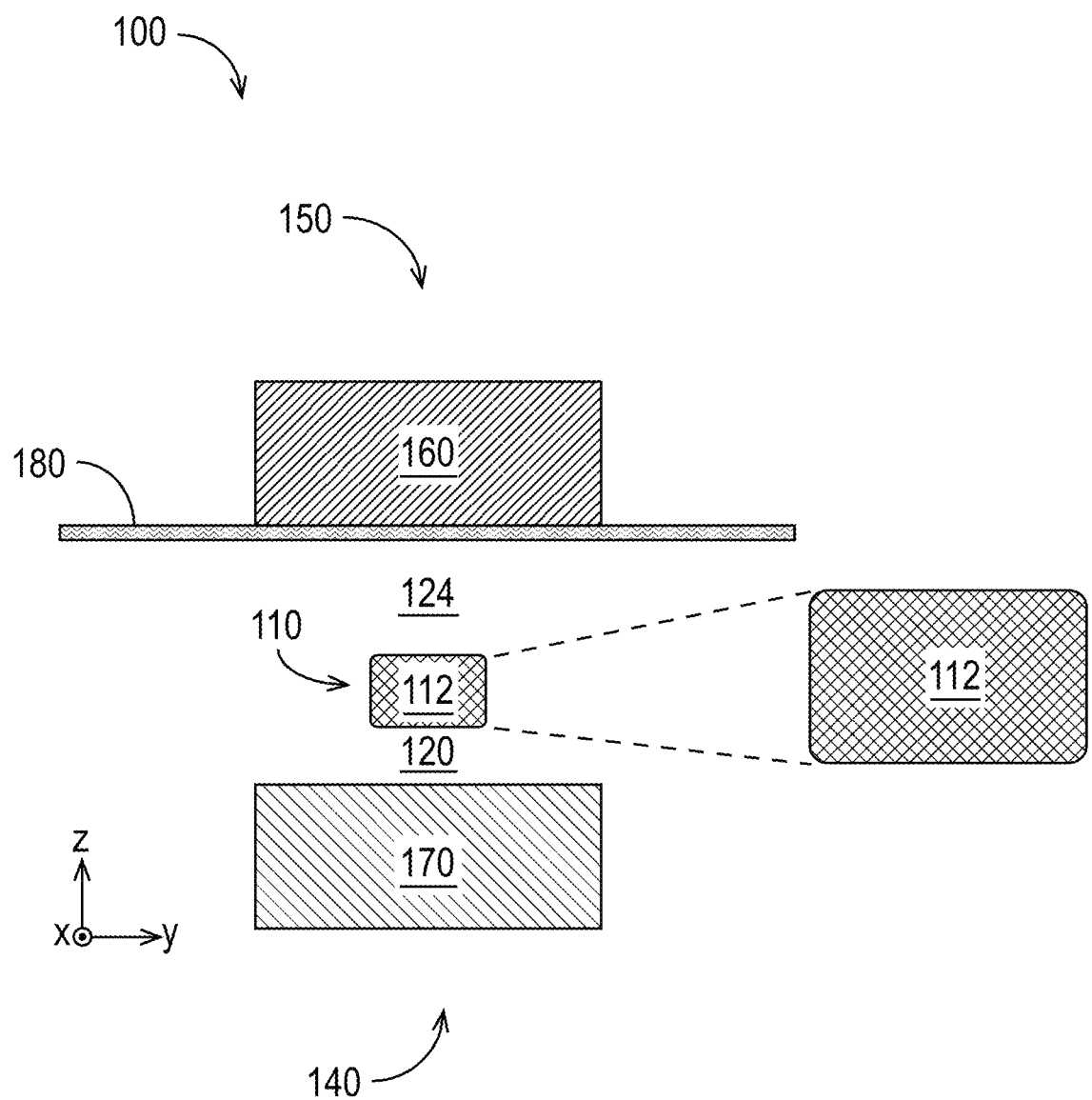
FIGS. 4A, 4B, and 4C are ABS views of portions of exemplary HAMR heads in accordance with some embodiments.
Figure 4B:
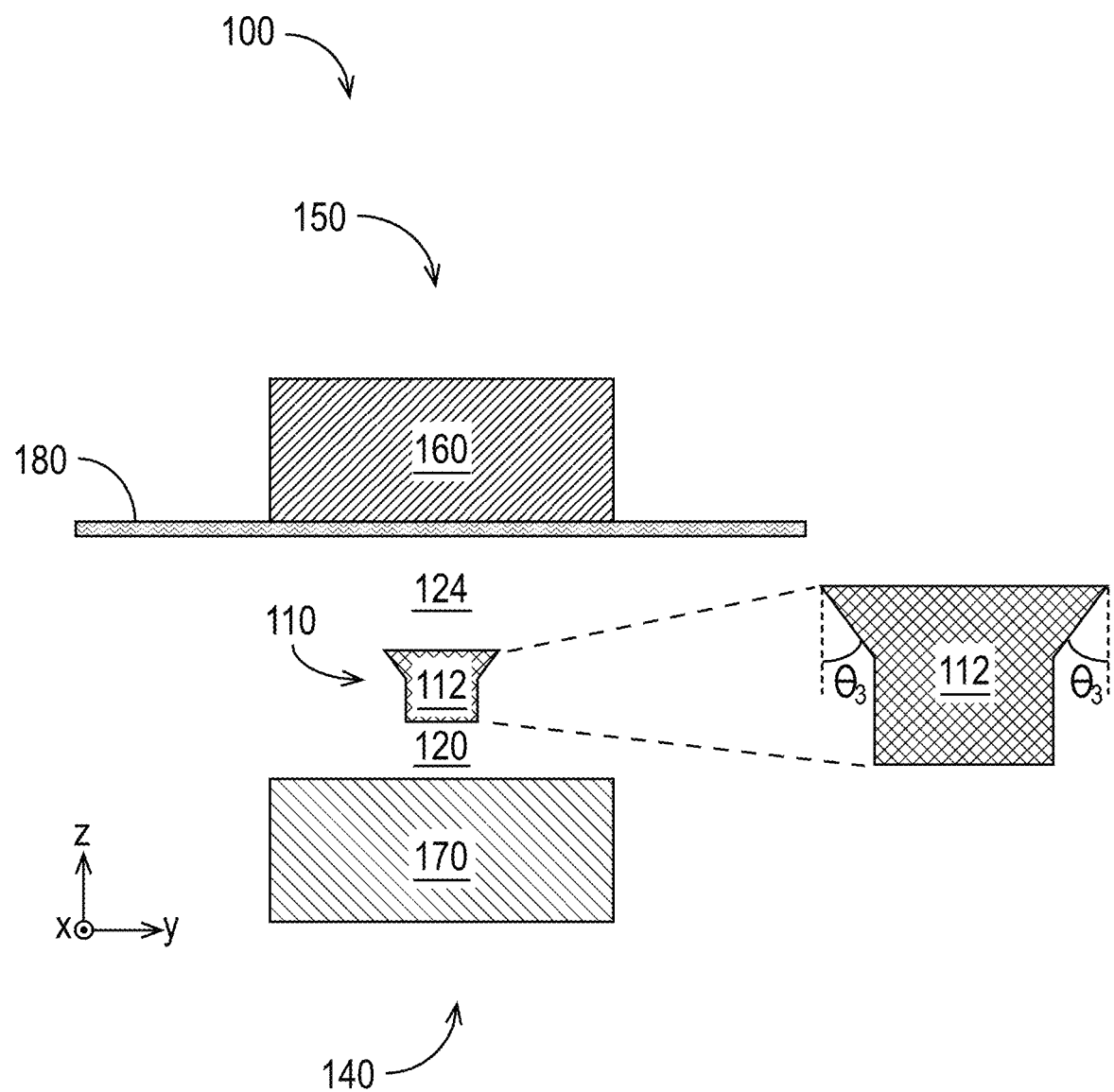
Figure 4C:
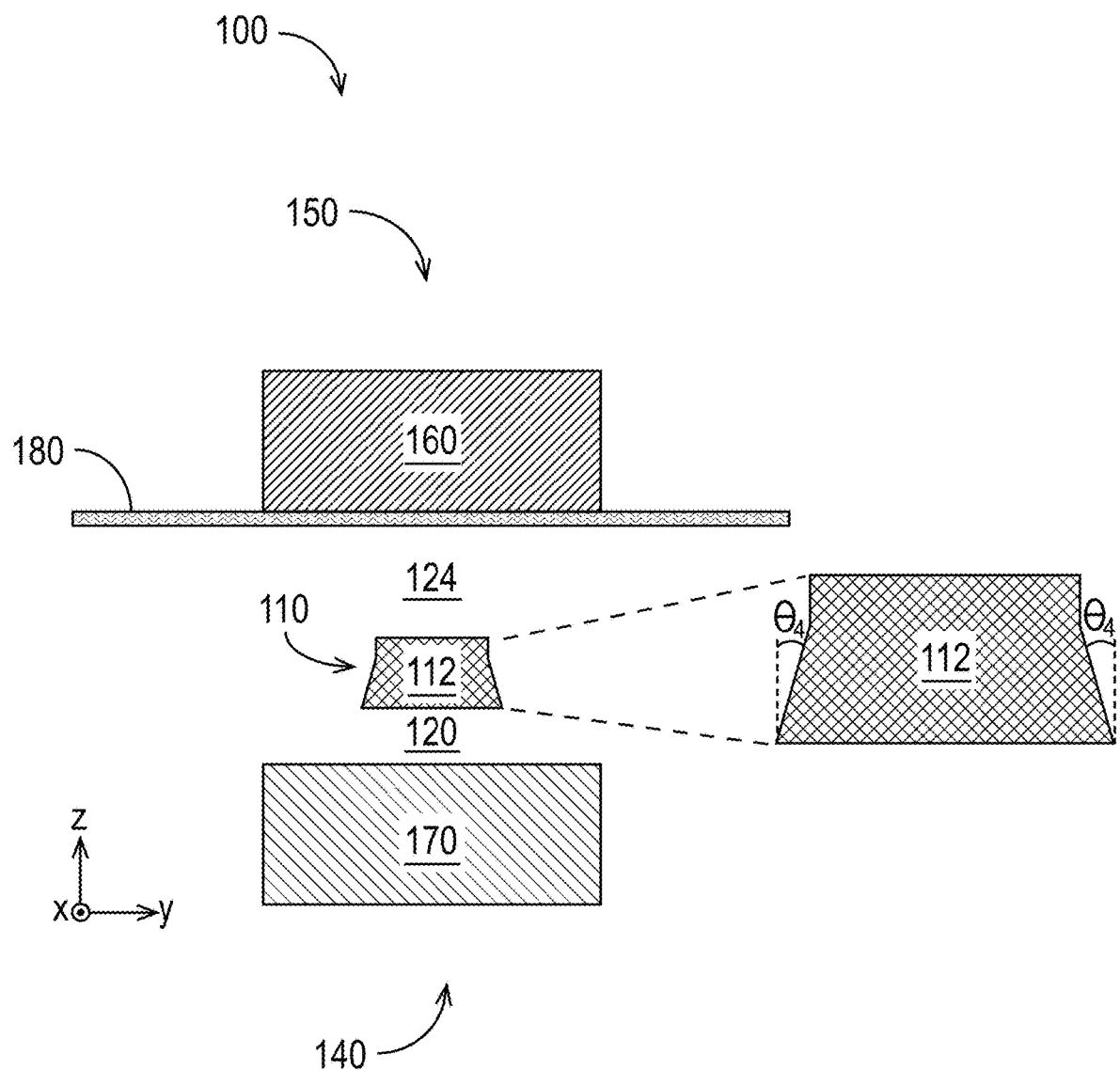

At the ABS 130, the output tip 112 of the NFT 110 can have any suitable shape. FIGS. 4A, 4B, and 4C are ABS views of exemplary portions 100 of HAMR heads in accordance with some embodiments. Certain elements shown and described in the context of FIG. 2 are also shown in FIGS.

4A, 4B, and 4C. The previous descriptions of those elements apply here and are not repeated. A rectangular coordinate system is shown in each of FIGS. 4A, 4B, and 4C. The ABS 130 lies in the y-z plane, and the z-axis lies in the track direction (e.g., the direction in which data is recorded, the uptrack and/or downtrack direction) and points toward the trailing side 150. Thus, the y-axis is in the cross-track direction.

FIG. 4A shows an example embodiment in which the output tip 112 has a substantially rectangular shape when viewed from the ABS 130. Thus, the four sides of the output tip 112 are substantially parallel or perpendicular to both the y-axis and the z-axis.

FIGS. 4B and 4C illustrate example embodiments in which the output tip 112 has a substantially trapezoidal shape when viewed from the ABS. In other words, the sides of the output tip 112 are at least partially angled with respect to the z-axis (the track direction). FIG. 4B illustrates an example embodiment in which, as the value of z increases beyond some value, the boundaries of the output tip 112 flare out at an angle $\theta_3$ from the z-axis in the positive and negative y-directions. The value of the angle $\theta_3$ can be any suitable value and can be optimized to meet design goals. In some embodiments, the value of the angle $\theta_3$ is approximately 60 degrees.

FIG. 4C illustrates an example embodiment in which, as the value of z increases beyond some value, the output tip 112 flares in at an angle $\theta_4$ from the z-axis in the positive and negative y-directions. The value of the angle $\theta_4$ can be any suitable value and can be optimized to meet design goals. In some embodiments, the value of the angle $\theta_4$ is approximately 15 degrees.

The shape of the output tip 112 at the ABS 130 can be selected and/or optimized to meet design goals or constraints. For example, the shape of the output tip 112 shown in FIG. 4A may provide the highest gradient, whereas the shape of the output tip 112 shown in FIG. 4B may provide better heat sinking and reliability, but a lower gradient, than the substantially rectangular shape. The shape of the output tip 112 shown in FIG. 4C may provide a good trade-off between gradient and reliability by providing a gradient that is higher than that provided by the output tip 112 shown in FIG. 4B but lower than that provided by the output tip 112 shown in FIG. 4A, and reliability that is better than that provided by the output tip 112 of FIG. 4A but not as good as that provided by the output tip 112 of FIG. 4B.

It is to be appreciated that FIGS. 4A, 4B, and 4C illustrate example shapes of the output tip 112 at the ABS 130, and that other shapes are possible. Furthermore, although FIGS. 4B and 4C illustrate piecewise sides of the output tip 112, it is to be understood that the sides may transition more smoothly from being substantially parallel to the z-axis to being at an angle to it. The examples of FIGS. 4A, 4B, and 4C are not intended to be limiting. Other non-rectangular shapes in addition to those shown in FIGS. 4B and 4C are possible and are contemplated, including shapes that include curvilinear edges of the output tip 112.

Figure 5:
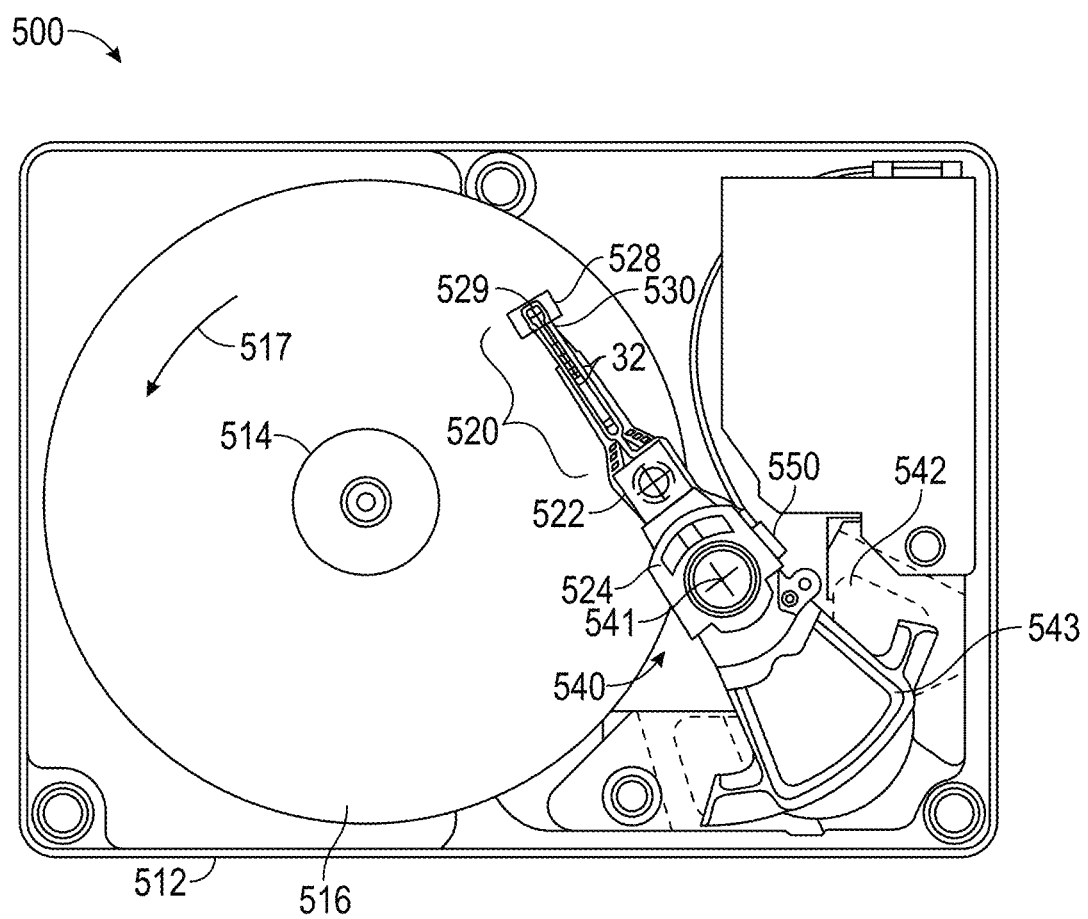
FIG. 5 is a top view of an exemplary data storage device that includes a HAMR head with a trailing bevel in accordance with some embodiments.

Embodiments of the exemplary HAMR head described in the context of FIGS. 2, 4A, 4B, and 4C or fabricated according to the exemplary method 200 discussed in the context of FIG. 3 can be included in a data storage device (e.g., in a slider used therein). FIG. 5 is a top view of an exemplary data storage device, namely a head/disk assembly of an exemplary hard disk drive 500 with the cover removed. The exemplary hard disk drive 500 includes a rigid base 512 supporting a spindle 514 that supports at least one disk 516. The spindle 514 is rotated by a spindle motor (not shown), which, in operation, rotates the at least one disk 516 in the direction shown by the curved arrow 517. The exemplary hard disk drive 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to an air-bearing (or, in the case that helium or another gas is used instead of air inside the disk drive, a gas-bearing) slider 528. A magnetic recording read/write head 529 is located at the end or trailing surface of the slider 528. The write head 529 may include embodiments of the HAMR head (e.g., embodiments of the exemplary portion 100) described herein. The flexure 530 enables the slider 528 to "pitch" and "roll" on an air (or gas) bearing generated by the rotating disk 516.

The exemplary hard disk drive 500 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. When energized by control circuitry (not shown), the voice coil 543 moves and thereby rotates E-block 524 with the rigid arms 522 and the at least one load beam assembly 520 to position the read/write head over the data tracks on the disk 516. The array 32 of electrically conductive interconnect traces or lines connects at one end to the read/write head 529 and at its other end to read/write circuitry contained in an electrical module or chip 550, which, in the exemplary hard disk drive 500 of FIG. 5, is secured to a side of the E-block 524. The chip 550 includes a read/write integrated circuit (R/W IC).

As the disk 516 rotates, the disk 516 drags air under the slider 528 and along the air-bearing surface (ABS) of the slider 528 in a direction approximately parallel to the tangential velocity of the disk 516. As the air passes under the ABS, air compression along the air flow path causes the air pressure between the disk 516 and the ABS to increase, which creates a hydrodynamic lifting force that counteracts the tendency of the at least one load beam assembly 520 to push the slider 528 toward the disk 516. The slider 528 thus flies above the disk 516 but in close proximity to the surface of the disk 516.

The slider 528 supports a read/write head 529, which in at least some of the embodiments disclosed herein is a HAMR head that includes an inductive write head, the NFT, and an optical waveguide. (As stated previously, the term "HAMR" as used herein refers to all variants of thermally-assisted recording, including TAR, TAMR, EAMR, and HAMR.) A semiconductor laser with a wavelength of 780 to 980 nm may be used as the HAMR light source. The laser may be supported on the top of the slider 528, or it may be located on the flexure 530 and coupled to the slider 528 by an optical channel. As the disk 516 rotates in the direction of the curved arrow 517, the movement of the rotary actuator assembly 540 allows the HAMR head on the slider 528 to access different data tracks on the disk 516. The slider 528 is typically formed of a composite material, such as a composite of alumina/titanium-carbide ($Al_2O_3$/TiC). FIG. 5 illustrates only one disk 516 surface with the slider 528 and read/write head 529, but there may be multiple disks 516 stacked on a hub that is rotated by a spindle motor, with a separate slider 528 and read/write head 529 associated with each surface of each disk 516.

In operation, after the voice coil 543 has positioned the read/write head 529 over the data tracks on the disk 516, the read/write head 529 may be used to write information to one or more tracks on the surface of the disk 516 and to read previously-recorded information from the tracks on the surface of the disk 516. The tracks may comprise discrete data islands of magnetizable material (e.g., bit-patterned media), or the disk 516 may have a conventional continuous magnetic recording layer of magnetizable material. Processing circuitry in the exemplary hard disk drive 500 (e.g., on the chip 550) provides to the read/write head 529 signals representing information to be written to the disk 516 and receives from the read/write head 529 signals representing information read from the disk 516.

To read information from the disk 516, the read/write head 529 may include at least one read sensor. The read sensor(s) in the read/write head 529 may include, for example, one or more giant magnetoresistance (GMR) sensors, tunneling magnetoresistance (TMR) sensors, or another type of magnetoresistive sensor. When the slider 528 passes over a track on the disk 516, the read/write head 529 detects changes in resistance due to magnetic field variations recorded on the disk 516, which represent the recorded bits.

It is to be understood that, as used herein, the term "etching" refers generally to any process that removes material from a device, and that it includes both wet (e.g., immersion etching, spray etching, etc.) and dry (e.g., ion beam milling, reactive ion etching (RIE), plasma etching, etc.) techniques. The term "planarization" incudes any technique that offsets the effects of a varied wafer topography. Examples of planarization techniques include multilayer resist processing, the use of planarization layers, reflow techniques, and physically flattening the surface by chemical-mechanical polishing (CMP).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two angles as "substantially equal" means that the two angles are the same for all practical purposes, but they might not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A heat-assisted magnetic recording (HAMR) head, comprising:
   a waveguide core;
   a main pole; and
   a near-field transducer (NFT) situated between the main pole and the waveguide core, wherein the NFT comprises a trailing beveled edge in a trailing-side surface of the NFT, wherein the trailing-side surface of the NFT faces the main pole, and wherein the trailing beveled edge is at a first angle to an air-bearing surface (ABS) of the HAMR head, wherein the first angle is greater than zero and less than 90 degrees.

2. The HAMR head recited in claim 1, wherein the first angle is approximately 45 degrees.

3. The HAMR head recited in claim 1, wherein the first angle is between about 15 degrees and about 60 degrees.

4. The HAMR head recited in claim 1, further comprising a dielectric layer adjacent to the trailing beveled edge.

5. The HAMR head recited in claim 4, further comprising a pole diffusion barrier layer situated between the NFT and the main pole.

6. The HAMR head recited in claim 5, wherein the main pole comprises a leading-side edge at a second angle to the ABS of the HAMR head, wherein the second angle is greater than zero and less than 90 degrees.

7. The HAMR head recited in claim 6, wherein the first angle and the second angle are approximately equal.

8. The HAMR head recited in claim 1, wherein the main pole comprises a leading-side edge at a second angle to the ABS of the HAMR head, wherein the second angle is greater than zero and less than 90 degrees.

9. The HAMR head recited in claim 8, wherein the first angle and the second angle are between about 15 degrees and about 60 degrees.

10. The HAMR head recited in claim 1, further comprising a pole diffusion barrier layer situated between the NFT and the main pole.

11. The HAMR head recited in claim 1, wherein a shape of the NFT in an ABS view of the HAMR head is substantially rectangular or substantially trapezoidal.

12. A data storage device, comprising:
a magnetic recording medium; and
the HAMR head recited in claim 1.

13. A method of fabricating a heat-assisted magnetic recording (HAMR) head, the method comprising:
depositing material for a near-field transducer (NFT);
creating a trailing-side surface of the NFT;
creating a trailing beveled edge in the trailing-side surface of the NFT at an air-bearing surface (ABS) of the HAMR head, wherein the trailing beveled edge is at an acute angle to the ABS and a remainder of the trailing-side surface of the NFT is substantially perpendicular to the ABS; and
forming a dielectric layer over the trailing beveled edge.

14. The method recited in claim 13, wherein creating the trailing beveled edge in the trailing-side surface of the NFT at the ABS of the HAMR head comprises:
etching at least a portion of the trailing-side surface of the NFT.

15. The method recited in claim 13, wherein forming the dielectric layer over the trailing beveled edge comprises:
depositing an insulator material over the trailing beveled edge and over at least a portion of the remainder of the trailing-side surface of the NFT; and
removing material from the at least a portion of the remainder of the trailing-side surface of the NFT.

16. The method recited in claim 13, further comprising:
after forming the dielectric layer over the trailing beveled edge, depositing a pole diffusion barrier layer over an exposed portion of the NFT and over the dielectric layer.

17. The method recited in claim 16, further comprising:
after depositing the pole diffusion barrier layer of the exposed portion of the NFT and over the dielectric layer, forming a main pole over the pole diffusion barrier layer.

18. A slider, comprising:
a waveguide configured to propagate light emitted by a light source and to provide an evanescent wave at an air-bearing surface (ABS) of the slider;
a main pole configured to emit a recording magnetic field to affect a magnetic medium; and
a near-field transducer (NFT) situated between the waveguide and the main pole, wherein the NFT comprises a trailing beveled edge in a trailing-side surface of the NFT, wherein the trailing-side surface of the NFT faces the main pole, and wherein the trailing beveled edge extends to the ABS at an acute angle to the ABS.

19. The slider recited in claim 18, further comprising a dielectric layer between the main pole and the NFT, wherein the dielectric layer is adjacent to the trailing beveled edge.

20. The slider recited in claim 19, further comprising a pole diffusion barrier layer situated between the dielectric layer and the main pole.

21. The slider recited in claim 20, wherein the acute angle is a first acute angle, and wherein the main pole comprises a leading beveled edge at a second acute angle to the ABS.

22. The slider recited in claim 21, wherein the first acute angle and the second acute angle are approximately equal.

23. The slider recited in claim 18, wherein, in an ABS view of the slider, at least a portion of a side of an output tip of the NFT is at an angle to a track direction.

24. The slider recited in claim 23, wherein the angle is between approximately 15 degrees and approximately 60 degrees.

25. The slider recited in claim 18, wherein, in an ABS view of the slider, a shape of an output tip of the NFT is substantially trapezoidal.

26. A data storage device, comprising:
a recording medium; and
the slider recited in claim 18.

* * * * *